Patented Apr. 21, 1925.

1,534,832

UNITED STATES PATENT OFFICE.

SALO BERGEL, OF BERLIN-WILMERSDORF, GERMANY, ASSIGNOR OF TWO-THIRDS TO CHEMISCHE FABRIK GRÜNAU LANDSHOFF & MEYER, AKTIENGESELLSCHAFT, OF GRUNAU, NEAR BERLIN, GERMANY, AND C. A. F. KAHLBAUM, CHEMISCHE FABRIK, GESELLSCHAFT MIT BESCHRÄNKTER HAFTUNG, OF ALDERSHOF, NEAR BERLIN, GERMANY.

PROCESS FOR PRODUCING A REMEDY FOR SYPHILIS.

No Drawing. Application filed April 1, 1922. Serial No. 548,856.

*To all whom it may concern:*

Be it known that I, SALO BERGEL, citizen of the German Republic, residing at Berlin-Wilmersdorf, Germany, have invented certain new and useful Improvements in Processes for Producing a Remedy for Syphilis, of which the following is a specification.

This invention relates to a new or improved process for the production of an anti-syphilis substance.

The process consists essentially in treating animals, more particularly such animals as are susceptible to syphilis, like monkeys, rabbits, guinea-pigs and the like, first, in the manner described in my German Patents 254533 and 259374, injecting lecithin or another lipoid into the chest or the abdomen of those animals, so that the exudants formed, the juice expressed from the lymphatic glands, the spleen, the plexus, as well as the blood fluid acquire an increased fat decomposing capacity, precipitate lecithin and give with alcoholic foetal luetic extract of the liver the Wassermann reaction.

When as a result of the preliminary treatment described above, the animal organism has acquired new lipolytic and complement-binding properties with regard to lecithin and the lecithin like lipoidic portions of the lues-antigen, the animals after a period of rest of about 10–14 days are subjected to an entirely different second treatment in which the newly acquired properties of the animal body resulting in producing an entirely new, theretofore non-existent capacity of decomposing, splitting up and dissolving the syphilis spirochaetes, are availed of.

The process therefore consists in injecting into the chest and abdominal cavity of these animals, as the parts of the body best capable of resistance and where most of the anti-substances exist, small doses of syphilis spirochaetes or spirochaete-like syphilitic materials suspended in lecithin, together with such substances as are capable of dissolving the syphilis spirochaetes or which assist the dissolution which the animal body unaided is not capable of effecting.

Together with the syphilis producers 2–3 ccm of a 1–3% solution of sodium taurocholate, gall, saponin substances or sarsaparilla, in doses of a size and concentration not poisonous to the animal body and not capable of dissolving the spirochaetes are injected repeatedly at intervals of 2–3 weeks in such a manner that in each succeeding injection the dose of the spirochaetes containing materials is increased in accordance with the endurance of the body and the increase of the dissolving capacity of inflammation-causing exudations, while the dose and the concentration of the solvent is gradually reduced in accordance with the increase in the dissolving capacity of the humours, in order to induce the body in this manner to produce gradually strong anti-agents, substances which have the most powerful dissolving action possible, and to bring the body to such a state that the inflammation-causing exudations of the chest and abdominal cavity, the juice expressed from the lymphatic glands, the spleen, the plexus and also, although in a minor degree, the blood acquire the capacity to decompose and dissolve syphilis spirochaetes after an action extending over several days at 37° C., even externally to the body of the animal.

The inflammation-causing exudants of the chest and abdominal cavity, the expressed juices of the lymphatic glands, the spleen, the plexus as well as the blood fluid of the animals which owing to the preliminary treatment have acquired new, not previously possessed properties of the before-described kind, are treated in the manner disclosed in my German Patents 254533 and 259374 and the products obtained are employed either by themselves or in combination with salvarsan or mercury preparations.

By the improved process of the preliminary treatment not only exudants very rich in lymphocytes are obtained, which supply anti-substances against lipoid substances in general and give the Wassermann reaction with luetic extracts of foetal liver, which also comes about with other lipoids as antigen, but the generation of anti-substances against syphilitic material or syphilis spirochaetes themselves is stimulated in a particularly novel manner. While subcutaneous injections of syphilitic materials do not produce effective antisubstances in the serum of animals used for experimental purposes, it is possible by utilizing the properties of the organism changed by the preliminary treatment by means of graduated doses and with the application of agents promoting the solution of the spirochaetes, to induce the body to produce or enrich anti-substances against spirochaetes in the organs or humours of the animals themselves. By treating the spirochaetes with chemical agents which assist their solution, but in doses and concentration not affecting the solution, it is possible to bring the body gradually to a condition in which it will cause such an augmentation of the anti-substances produced by the specific adjustment of the lymphozytes and the generating organs of the lymphozytes as to acquire the power to decompose the syphilis spirochaetes after a few days action upon these at the temperature of the body.

It will be understood that I do not limit myself to the details of this process, but that these may be varied within the ambit of the claim without departing from the spirit of the invention.

What I claim as my invention and desire to secure by Letters Patent is:—

1. The herein described process for producing a remedy for syphilis which consists in repeatedly injecting lipoids into parts of the body most capable of resistance of an animal susceptible to syphilis, then repeatedly injecting at certain intervals into said parts of the animal's body spirochaetes containing syphilitic material and suspended in lecithin, and at the same time repeatedly injecting agents capable of dissolving spirochaetes and embraced in the group containing gall, sodium taurocholate, saponin-containing substances and sarsaparilla, the concentration and quantities of the doses of the spirochaetes being gradually increased and of the dissolving agents being gradually decreased, then collecting (a) the exudants of said parts of the animal's body caused by inflammation, (b) extracts from the lymphatic glands, the spleen and the omentum and (c) the blood serum, and finally separating the lecithin from this collected liquid by filtration.

2. In a process for producing an anti-substance against syphilis spirochaetes, in combination with the steps claimed in claim 1, the additional step of combining with salvarsan the filtrate produced by separating the lecithin from the liquid.

In testimony whereof I affix my signature.

SALO BERGEL.